United States Patent
Sato

(10) Patent No.: US 6,798,936 B2
(45) Date of Patent: Sep. 28, 2004

(54) OPTICAL SWITCHING SYSTEM AND OPTICAL SWITCHING METHOD

(75) Inventor: Akinobu Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 205 days.

(21) Appl. No.: 10/189,410

(22) Filed: Jul. 8, 2002

(65) Prior Publication Data

US 2003/0059154 A1 Mar. 27, 2003

(30) Foreign Application Priority Data

Jul. 9, 2001 (JP) ........................................ 2001-207232

(51) Int. Cl.[7] .............................................. G02B 6/26
(52) U.S. Cl. .............................. 385/16; 385/17; 385/24; 398/50; 398/83
(58) Field of Search .............................. 385/16–24, 37; 398/45, 48–50, 82–88

(56) References Cited

U.S. PATENT DOCUMENTS

| | | | |
|---|---|---|---|
| 5,457,556 A | * | 10/1995 | Shiragaki ..................... 398/50 |
| 2003/0118275 A1 | * | 6/2003 | Kim et al. ..................... 385/17 |
| 2003/0206743 A1 | * | 11/2003 | Yanagimachi ............... 398/100 |

FOREIGN PATENT DOCUMENTS

| | | |
|---|---|---|
| JP | 11-243564 A | 9/1999 |
| JP | 11-275614 A | 10/1999 |

OTHER PUBLICATIONS

Nikkei Electronics, Jan. 1, 2001, Issue No. 788, pp. 146–167.

* cited by examiner

Primary Examiner—Hemang Sanghavi
(74) Attorney, Agent, or Firm—Sughrue Mion, PLLC

(57) ABSTRACT

An optical switching system comprises a first space division type optical switch positioned at an input side which performs switching on an optical fiber by fiber basis, a second space division type optical switch positioned at an output side which performs switching on an optical fiber by optical basis, and a wavelength division type optical switch which receives a wavelength-multiplexed signal through an optical fiber, performs wavelength division, switching on a wavelength by wavelength basis, and wavelength multiplexing, and outputs a wavelength-multiplexed signal through an optical fiber. Some of optical fibers output from the first space division type optical switch are directly led to the second space division type optical switch, and the rest of the optical fibers output therefrom are led to the wavelength division type optical switch. Optical fibers output from the wavelength division type optical switch are led to the second space division type optical switch.

16 Claims, 11 Drawing Sheets

11 first space division type optical switch
12 second space division type optical switch
13 wavelength division type optical switch
13a switching unit
14 drop port
15 add port
17 control signal 11  first space division type optical switch
12  second space division type optical switch
13  wavelength division type optical switch
13a switching unit
14  drop port
15  add port
17  control signal 21 first optical fiber
22 lens
23 reflection mirror
24 collimation lens
25 angle-changeable mirror matrix
26 second optical fiber 27 optical branching device
28 optical gate switch matrix
29 optical multiplexing device

| 31 | first slider | 35 | arrow |
|---|---|---|---|
| 32 | first optical fiber | 36 | moving direction of first slider |
| 33 | second slider | 37 | moving direction of second slider |
| 34 | second optical fiber | 38 | frame |

41 optical switch

FIG. 9

| example of demonstration | embodiment | type of optical switch (note 1) | | | number of optical switch port (note 2) | | | result | |
|---|---|---|---|---|---|---|---|---|---|
| | | first space division type optical switch | second space division type optical switch | wavelength division type optical switch | first space division type optical switch | wavelength division type optical switch | second space division type optical switch | total insertion loss (dB) | length of the device L×W×H |
| 1 | 1 | MEMS | MEMS | MEMS | 16×20 | 380×380 | 20×16 | 2.5 | 50×60×180 |
| 2 | 1 | MEMS | semi-conductor | MEMS | 16×20 | 380×380 | 20×16 | 2.5 | 50×120×180 |
| 3 | 1 | mechanical | MEMS | mechanical | 16×20 | 380×380 | 20×16 | 0.3 | 50×60×180 |
| 4 | 1 | mechanical | MEMS | mechanical | 24×24 | 1260×1260 | 24×24 | 0.5 | 50×120×180 |
| 5 | 1 | mechanical | MEMS | mechanical | 36×36 | 4440×4440 | 36×36 | 0.8 | 50×240×180 |
| 6 | 2 | MEMS | MEMS | MEMS | 16×20 | 380×380 | 20×16 | 3.8 | 50×60×180 |
| 7 | 3 | MEMS | MEMS | MEMS | 16×20 | 380×380 | 20×16 | 2.5 | 50×360×180 |
| first example of comparison | | | | | | 700×700 | | 0.5 | 80×950×180 |
| second example of comparison | | | | | | 700×700 | | 14.3 | 50×120×180 | note 1) MEMS; MEMS type optical switch
semiconductor; optical gate switch
mechanical; movable optical fiber type mechanical optical switch note 2) M = 16, r = 12, y = 8, x = z = 60, number of wavelength-multiplexing = 40 are common
but, at fourth example; M = 24, y = 12, x = z = 300, number of wavelength-multiplexing = 80
at fifth example, M = 36, y = 24, x = z = 600, number of wavelength-multiplexing = 160 wavelength division type optical switch with O/E/O conversion
wavelength division type optical switch without O/E/O conversion 51 optical wave divider
52 optical wave multiplexer
53 space division type optical switch

OPTICAL SWITCHING SYSTEM AND OPTICAL SWITCHING METHOD

BACKGROUND OF THE INVENTION

1. Field of the Invention

The present invention relates to an optical switching system and an optical switching method used in the field of an optical communication system, and particularly relates to an optical switching system and an optical switching method wherein a wavelength division type technique and a space division type technique are effectively combined.

2. Related Art

In the recent years, optical switches for switching an optical signal as it is without converting it to an electric signal have been gaining attention in the field of an optical communication system, as a technique for realizing a large capacity switch which is hard to realize with an electric switch. Optical switches include a space division type, a wavelength division type, a time division type, etc. Further, there are techniques in which those types are combined, such as a wavelength/space division type, a wavelength/time division type, etc. Some of those combined types will now be explained.

FIG. 10 is a block diagram of an ordinarily conceivable wavelength division type optical switching system. This wavelength division type optical switching system comprises optical wave dividers 51, optical wave multiplexers 52, and space division type optical switches 53. The optical wave dividers 51 are provided to input light transmission paths Input 1 to Input k respectively, and divide an optical signal in accordance with frequencies. One space division type optical switch 53 includes (k×k) number of space division type optical switches prepared for n number of lights λ1 to λn obtained by division and each having its own wavelength. The optical wave multiplexers 52 are provided to output light transmission paths Output 1 to Output k respectively, and multiplex optical signals each having its own wavelength. With this structure, the wavelength division type optical switch needs to comprise an optical wave divider 51 and optical wave multiplexer 52 for every input or output optical fiber, and further to comprise a space division type optical switch for every wavelength. Therefore, a lot of optical fibers are necessary, and this is not suitable for miniaturizing the device.

On the other hand, Unexamined Japanese Patent Application KOKAI Publication NO. H11-243564 discloses an optical switch having intermediate function and structure between a space division type optical switching system for switching light paths on an optical fiber by optical fiber basis, and a wavelength division type optical switching system for switching light paths on a wavelength by wavelength basis. This optical switch will be explained with reference to FIG. 11.

As illustrated in FIG. 11, this optical switch comprises a plurality of branching units 54, insertion units 55, a first space division type optical switch 56, a second space division type optical switch 57, and a third space division type optical switch 58. The branching units 54 are provided to input light transmission paths Input 1 to Input k1, respectively. The branching units 54 select a signal having a predetermined wavelength from an input wavelength-multiplexed optical signal, output the selected signal to the second space division type optical switch 57, and output the remaining optical signal to the first space division type optical switch 56. The second space division type optical switch 57 routes the branched optical signal to a predetermined output light transmission path in order to output the branched optical signal. On the other hand, the insertion units 55 multiplex an optical signal input by the third space division type optical switch 58 with the optical signal input by the first space division type optical switch 56, and after this, transmit the resultant optical signal to output light transmission paths Output 1 to Output k1.

The optical switching system disclosed in Unexamined Japanese Patent Application KOKAI Publication No. H11-243564 is simply structured, and has an advantage that light transmission paths can be shared. However, since a wavelength-multiplexed signal needs to pass through the branching units 54 and/or insertion units 55, there is a problem that the loss of the optical signal is large. Further, in order to compensate for the loss of an optical signal, it is necessary to provide an optical amplifier, or to perform optical/electric/optical (hereinafter, referred to as O/E/O) conversion. However, there has been a problem that using such methods makes a device large-sized.

An example of an optical switching system employing a wavelength/space division type optical switch is disclosed in Unexamined Japanese Patent Application KOKAI Publication No. H11-275614. FIG. 12 is a schematic block diagram of this device. This optical switching system comprises optical multiplexers 61, an optical wavelength router 62, a space division optical switch 63, and optical wavelength selectors 64. The optical multiplexers 61 multiplex optical signals having different frequencies. The optical wavelength router 62 divides the optical signal multiplexed by the optical multiplexers 61 in accordance with wavelength, and outputs the divided signals to the space division optical switch 63. The space division optical switch 63 routes each optical signal in accordance with wavelength. Further, the optical wavelength selectors 64 each select an optical signal having a desired wavelength and output the selected optical signal. This optical switching system can increase or decrease the number of wavelengths to be multiplexed. This enables the number of wavelengths to be multiplexed to be optimized. Accordingly, effects that (1) the amount of hardware such as optical gate switches, etc. necessary for an optical switching system can be minimized, and that (2) in a case where the number of wavelengths to be multiplexed is reduced, optical amplifiers used as optical gate switches, etc. do not reach saturation, can be obtained.

However, the optical switching system disclosed in Unexamined Japanese Patent Application KOKAI Publication No. H11-275614 requires all data which will pass through this optical switching system to pass through the gate switches so as to be switched inside tile device. Accordingly, there is a problem that the device becomes large-sized.

On the other hand, as a large-sized optical switching system, one employing an MEMS (Microelectromechanical System), etc. is developed (NIKKEI ELECTRONICS Jan. 29, 2001 issue (NO. 788) pp. 146–167). With this optical switching system employing the MEMS, a small-sized optical switching system can be structured, even though there are a relatively large number of switch ports. However, since insertion loss of light caused in the large-sized optical switch is large, it is required to use an optical amplifier conversion device, etc. Therefore, there is a problem that the optical switching system as a whole becomes large-sized.

The above optical switching system can serve well under certain usage conditions, or with some restrictions. However, various problems might be caused, when considering increase in the traffic and demand for miniaturization of the optical switching device which might be expected in the future. That is, even in a case where conducting optical switching operation where large amount of data are processed, it will be inevitable in the future to miniaturize the optical switching system, increase the number of switch ports, and reduce the insertion loss of an optical signal. Especially, miniaturizing the device and increasing the number of switch ports are contradictory to each other. With regard to this, an efficient method which minimizes the need for performing O/E/O conversion now performed in the existing devices is demanded.

Further, as the amount of information handled in a network increases, the size of processing sections of an electronic circuit is enlarged, and this increases the cost of node devices.

SUMMARY OF THE INVENTION

It is an object of the present invention to solve the above-described problems of the prior arts.

It is another object of the present invention to provide an optical switching system which is adaptable to the future possible increase in the amount of communications through optical communication.

It is still another object of the present invention to provide an optical switching system which can satisfy miniaturization of the device, increasing the number of switch ports, and reducing insertion loss of an optical signal all at a same time.

To accomplish the above objects, according to the present invention, there is provided an optical switching system comprising:

a first space division type optical switch which is positioned at an input side, and performs switching on an optical fiber by optical fiber basis;

a second space division type optical switch which is positioned at an output side, and performs switching on an optical fiber by optical fiber basis; and a wavelength division type optical switch which receives a wavelength-multiplexed signal through all optical fiber, performs wavelength division, switching on a wavelength by wavelength basis, and wavelength multiplexing, and outputs a wavelength-multiplexed signal through an optical fiber, wherein some of optical fibers which are output from the first space division type optical switch are directly led to the second space division type optical switch, and the others are led to the wavelength division type optical switch, and optical fibers which are output from the wavelength division type optical switch are led to the second space division type optical switch.

Preferably, the wavelength division type optical switch may include an add port and/or a drop port for inputting or outputting a signal having a single wavelength.

More preferably, the first and second space division type optical switches may be constituted by a movable optical fiber type mechanical optical switch or a mirror type switch, and a switching unit of the wavelength division type optical switch may be constituted by a mirror type switch or an electric optical switch.

It is extremely difficult to satisfy miniaturization of a device of an optical switching system, increasing the number of ports, and reducing the loss of an optical signal at a same time. With regard to miniaturization of the optical switching system, simply to reduce the size of elements such as optical switches is effective. However, even more reliable way is to take advantage of characteristic of wavelength multiplex transmission. More than half of the optical signals to be processed by an optical switching system employing wavelength multiplex transmission are ones that merely pass through the optical switching system. Despite this, those optical signals that just pass through the switching system are unnecessarily processed. For example, all optical signals having different wavelengths are subjected to O/E/O conversion. This unnecessary processing has brought about the large-sizing of the device and increase in loss of an optical signal. With this situation taken into consideration, a research was made about an optical switching system employing wavelength multiplex transmission. As a result, a fact was found out that it is important to do away with wavelength division and wavelength multiplexing of signals that simply pass through the optical switching system while being wavelength-multiplexed on an optical fiber by optical fiber basis, in order to miniaturize the device, reduce the loss of an optical signal, and further increase the number of ports.

According to the optical switching system of the present invention, signals that simply pass through the switching system while being wavelength-multiplexed on an optical fiber by optical fiber basis only pass through the space division type optical switches, and optical signals that should be processed on a wavelength by wavelength basis pass through the wavelength division type optical switch which employs wavelength division and wavelength multiplex.

Further, another fact was found out that it is important to provide an add port and drop port to the wavelength division type optical switch, in order to apply the optical switching system according to the present invention in various ways, regardless of a basis system, a metro system, and a subscriber system.

BRIEF DESCRIPTION OF THE DRAWINGS

FIG. 9 is a diagram for explaining effects of the present invention.

EMBODIMENTS OF THE INVENTION

Embodiments of the present invention will now be explained below with reference to the drawings.

First Embodiment

Figure 1:
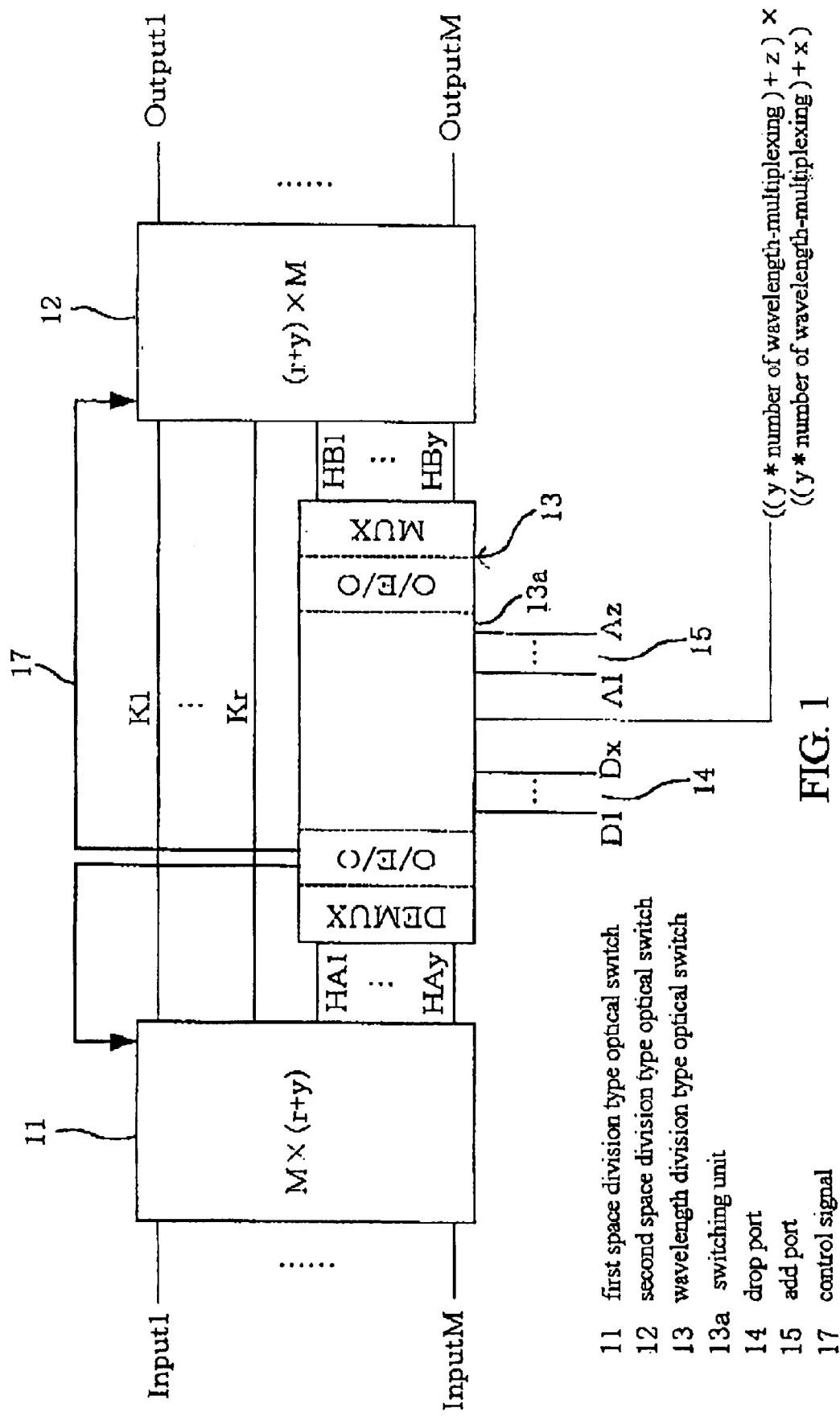
FIG. 1 is a block diagram showing a schematic structure of a first embodiment of the present invention.

FIG. 1 is a block diagram showing a basic structure of an optical switching system according to a first embodiment of the present invention.

As illustrated in FIG. 1, M number of optical fibers Input 1 to Input M for transmitting wavelength-multiplexed optical signals are led into a first space division type optical switch 11. In this first space division type optical switch 11, switching operation is performed on an optical fiber by optical fiber basis. Among optical fibers K1 to Kr, and HA1 to HAy on the outputting side of the first space division type optical switch 11, the optical fibers K1 to Kr are directly led to a second space division type optical switch 12. On the other hand, the optical fibers HA1 to HAy are led to a wavelength division type optical switch 13.

Information regarding switching is supplied from the wavelength division type optical switch 13 to the first space division type optical switch 11 and to the second space division type optical switch 12 as a control signal 17. In accordance with this control signal 17, signals that need to be routed on a wavelength by wavelength basis, and signals that requires add or drop of wavelength are routed to the wavelength division type optical switch 13. Signals that can be routed on an optical fiber by optical fiber basis are directly routed to the second space division type optical switch 12.

The number of input optical fibers is M, and the number of output optical fibers is (r+y). Thus, the number of switch ports in the first space division type optical switch is M×(r+y).

Among optical fibers led out from the first space division type optical switch 11, the optical fibers HA1 to HAy are input into the wavelength division type optical switch 13 due to the effect of the control signal 17. The wavelength-multiplexed optical signals of the optical fibers which are input into the wavelength division type optical switch 13 are wavelength-divided by a DEMUX (demultiplexer)), and after passing through an O/E/O conversion device (optical/electric/optical conversion device), input into a switching unit 13a. The control signal 17 for controlling the first and second space division type optical switches 11 and 12 are output from the O/E/O conversion device.

The switching unit 13a is further supplied with add signals A1 to Az which are input from an add port 15. Those optical signals are switching-processed, and some of the optical signals are branched to a drop port 14 as drop signals D1 to Dx. The rest of the optical signals are wavelength-multiplexed by a MUX (multiplexer) after O/E/O conversion, and then output to the second space division type optical switch 12 via optical fibers HB1 to Hby.

In this wavelength division type optical switch, when considering the number of wavelengths to be multiplexed, the number of signals to be input and the number of signals to be output are {y×(number of wavelengths to be multiplexed per optical fiber)+z} and {y×(number of wavelengths to be multiplexed per fiber)+x}, respectively. Accordingly, the number of switch ports is represented by {y×(number of wavelengths to be multiplexed per fiber)+z}×{y×(number of wavelengths to be multiplexed per fiber)+x}.

In the wavelength division type optical switch, the control signal regarding switching is transmitted to the space division type optical switches. Thus, die number of input ports of switching unit 13a might be lower than {y×(number of wavelengths to be multiplexed per fiber)+z}. However, the amount of information necessary for the control signal is not large, and the number of input ports is set to {y×(number of wavelengths to be multiplexed per fiber)+z} in many cases even though the control signal is output. Consequently, the number of input ports is regarded as the above value for the sake of convenience. This applies to the following embodiments.

On the other hand, the optical fibers K1 to Kr are directly led out from the first space division type optical switch 11 to the second space division type optical switch 12, and optical fibers HB1 to HBy are led out from the wavelength division type optical switch 13 to the second space division type optical switch 12. Wavelength-multiplexed signals which are switching-processed in the second space division type optical switch 12 are output to optical fibers Output 1 to Output M. At this time, information regarding switching is supplied from the wavelength division type optical switch 13 as a control signal 17.

In this second space division type optical switch 12, the number of input optical fibers is (r+y), and the number of output optical fibers is M. Accordingly, the number of switch ports of the second space division type optical switch 12 is (r+y)×M.

According to this method, since the switching system does not allow information unnecessary for the system to pass through the wavelength division type optical switch 13, it is possible reduce the insertion loss of optical signals. Further, this contributes to miniaturization of the device.

Further, according to the first embodiment, with the use of the add port and drop port, the optical switching system according to the present invention can be applied in a broad range, regardless or size of the system, such as a basic system, a metro system, a subscriber system, etc. The method of add and drop has no particular limitation.

Furthermore, some types of space multiplexing type optical switch are employable, in order to use one in the optical switching system according to the present invention, a movable optical fiber type mechanical optical switch, which may not be able to increase the number of optical switch ports so many, but at least can greatly reduce the insertion loss of light, is suitable in particular.

Second Embodiment

Figure 2:
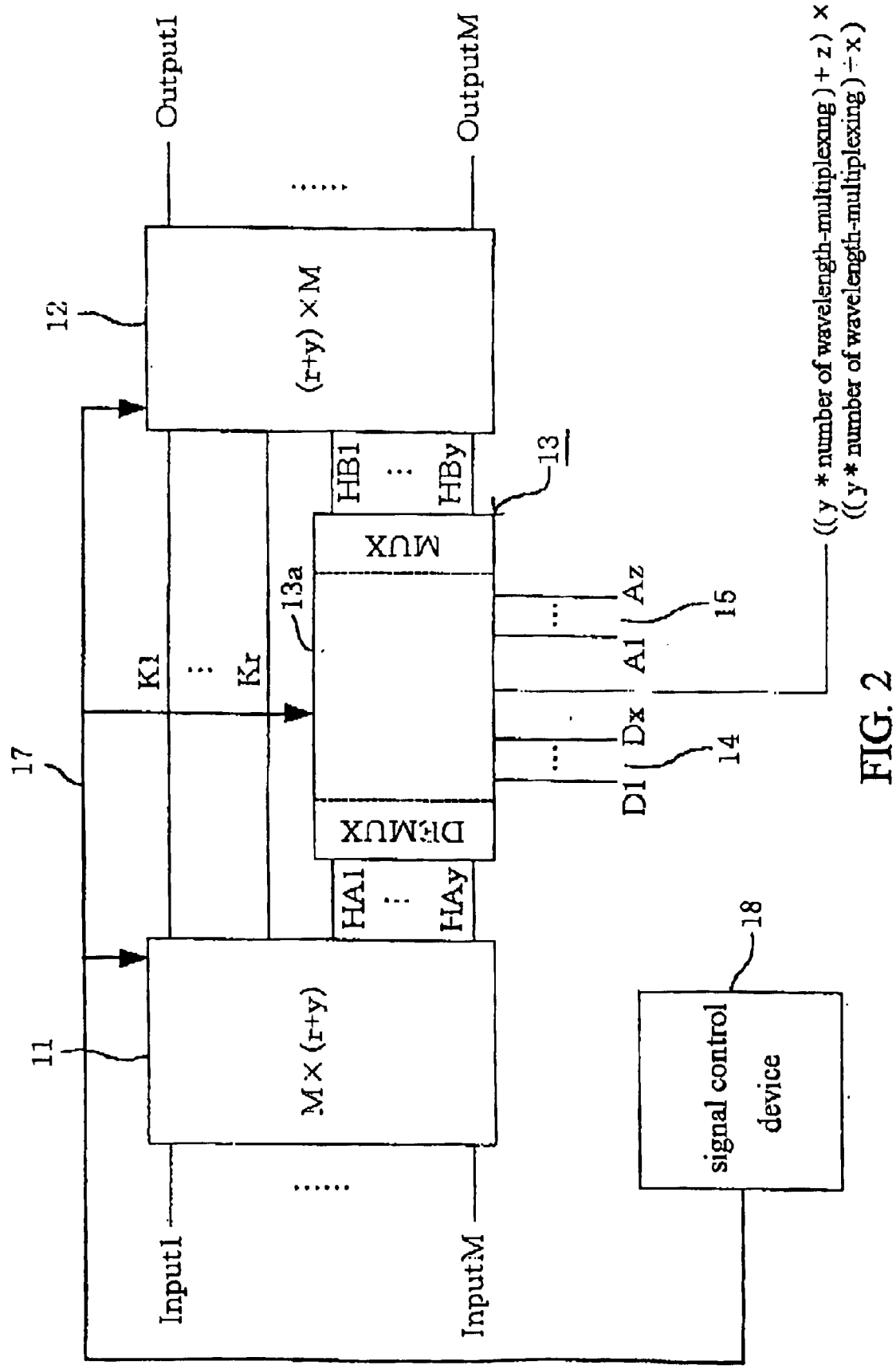
FIG. 2 is a block diagram showing a schematic structure of a second embodiment of the present invention.

FIG. 2 is a block diagram showing a structure of a second embodiment of the present invention. The second embodiment is different from the first embodiment in two points. (1) The O/E/O conversion device provided in the first embodiment is omitted in the second embodiment. (2) A signal control device 18 is provided in the second embodiment. In the first embodiment, a control signal regarding switching is O/E converted by the O/E/O conversion device, and then output from the wavelength division type optical switch 13. In the second embodiment, a control signal 17 is output form the signal control device 18.

An M number of optical fibers Input 1 to Input M for transmitting wavelength-multiplexed optical signals are led to a first space division type optical switch 11 shown in FIG. 2. The first space division type optical switch 11 performs switching on an optical fiber by optical fiber basis. Among optical fibers K1 to Kr and HA1 to HAy which are on the outputting side of the, space division type optical switch 11, the optical fibers K1 to Kr are directly led to a second space division type optical switch 12, and the optical fibers HA1 to HAy are led to a wavelength division type optical switch 13.

Switching information for controlling switching performed by the space division type optical switch 11 is supplied from the signal control device 18 as a control signal 17. Based on this switching information, signals that should be routed on a wavelength by wavelength basis and signal whose wavelength requires add or drop can be routed from the first space division type optical switch 11 to the wavelength division type optical switch 13. Input optical signals that can be routed on an optical fiber by optical fiber basis are directly routed to the second space division type optical switch 12.

At this time, the control signal 17 is also input to the wavelength division type optical switch 13. This control signal 17 performs control regarding optical switches, and performs control regarding degree of an angle of a mirror in a later-described MEMS type optical switch, for example.

Wavelength-multiplexed optical signals input from the first space division type optical switch 11 to the wavelength division type optical switch 13 through the optical fibers HA1 to HAy are wavelength-divided by a DEMUX, and after this, input to a switching unit 13a. The switching unit 13a is further supplied with add signals (optical signals) A1 to Az which are input from an add port 15. Those optical signals are switching-processed, and some of those optical signals are branched to a drop port 14 as drop signals D1 to Dx. The rest of the optical signals are wavelength-multiplexed by a MUX, and then output to the second space division type optical switch 12 through optical fibers HB1 to HBy.

The optical fibers K1 to Kr are led to the second space division type optical switch 12 from the fist space division type optical switch 11, and the optical fibers HB1 to HBy are led to the second space division type optical switch 12 from the wavelength division type optical switch 13. The second space division type optical switch 12 performs based on an optical fiber by optical fiber basis. Signals to be output are output through an M number of optical fibers Output 1 to Output M. Switching information required at this time is supplied from the signal control device 18 to the second space division type optical switch 12 as a control signal 17.

The structure relating to the number of switch ports in this second embodiment is identical to that of the first embodiment. Thus, the numbers of switch ports in the first space division type optical switch, the wavelength division type optical switch, and the second space division type optical switch are M×(r+y), {(y×number of wavelengths to be multiplexed)+z}×{(y×number of wavelengths to be multiplexed)+x}, and (r+y)×M, respectively.

In the first embodiment, a control signal composed of light obtained from optical fibers is converted to an electric signal, and this electric signal is input to the space division type optical switches and thereby to control the switching operation. On the other hand, in the second embodiment, the switching operation is directly performed under electrical control from outside. According to this method, the switching operation can be controlled by an electric signal from outside based on standard time.

Third Embodiment

Figure 3:
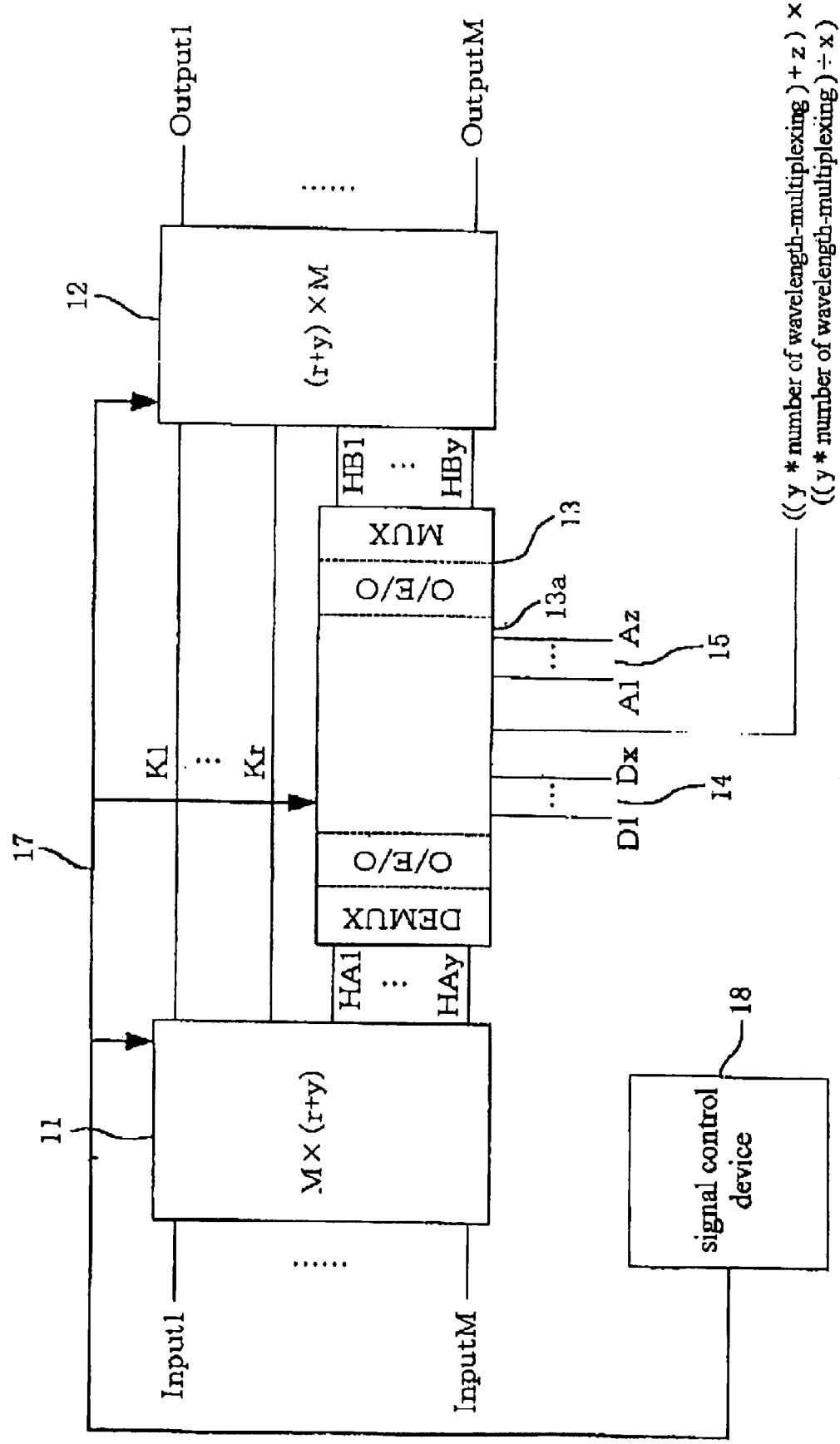
FIG. 3 is a block diagram showing a schematic structure of a third embodiment of the present invention.

FIG. 3 is a block diagram showing a schematic structure of a third embodiment of the present invention. The present embodiment is different from the second embodiment in that the present embodiment includes an O/E/O conversion device.

An M number of optical fibers Input 1 to Input M for transmitting wavelength-multiplexed optical signals are led to a first space division type optical switch 11 shown in FIG. 3. The first space division type optical switch 11 performs switching on an optical fiber by optical fiber basis. Among optical fibers which are led out from the fast space division type optical switch 11, optical fibers K1 to Kr are directly led to a second space division type optical switch 12, and optical fibers HA1 to HAy are led to a wavelength division type optical switch 13. Switching information at this time is obtained from a signal control device 18 as a control signal 17, and signals that should be routed on a wavelength by wavelength basis and signals whose wavelength requires add or drop are routed to the wavelength division type optical switch 13. Signals that can be routed on an optical fiber by optical fiber basis are routed to the second space division type optical switch 12.

Wavelength-multiplexed optical signals transmitted through the optical fibers and input to the wavelength division type optical switch 13 due to the effect of the control signal 17 are wavelength-divided by a DEMUX, and after passing through an O/E/O conversion device, input to a switching unit 13a. The control signal 17 for controlling the first and second space division type optical switches 11 and 12 is output from the O/E/O conversion device. The switching unit 13a is further supplied with add signals A1 to Az which are input from an add port 15. Those optical signals are switching-processed, and some of those optical signals are branched to a drop port 14 as drop signals D1 to Dx. The rest of the optical signals pass the O/E/O convention device again, and are wavelength-multiplexed by a MUX and output to the second space division type optical switch 12 through optical fibers HB1 to HBy.

Optical fibers K1 to Kr are led out from the first space division type optical switch 11 to the second space division type optical switch 12, and the optical fibers HB1 to HBy are led out from the wavelength division type optical switch 13 to the second space division type optical switch 12. The second space division type optical switch 12 performs switching on an optical fiber by optical fiber basis. Output signals from the second space division type optical switch 12 are output to M number of optical fibers Output 1 to Output M. At this time, switching information is obtained from the signal control device 18 as a control signal 17.

Likewise the first embodiment, the numbers of optical switch ports in the first space division type optical switch 11, the wavelength division type optical switch 13, and the second space division type optical switch 12 are represented by M×(r+y), {(y×number of wavelengths to be multiplexed)+z}×{(y×number of wavelengths to be multiplexed)+x}, and (r+y)×M, respectively.

According to the present embodiment, the control signal from the signal control device can be realized by an electric signal from an independent signal control device as described, but also can be realized by converting a control signal obtained from optical fibers to an electric signal, as explained in the first embodiment.

Next, optical switches used in the respective embodiments will now be explained.

FIRST EXAMPLE OF USED SWITCH

An MEMS (Micro-electromechanical System) type optical switch changes light paths by reflecting incident light from optical fibers by a minute mirror which is formed by vapor-depositing gold (Au), etc. on a silicon substrate. This optical switch can control the position of reflected light three-dimensionally. This optical switch has an advantage that the structure is simple.

The structure and effect of the MEMS type optical switch will be explained with reference to FIG. 4.

Figure 4:
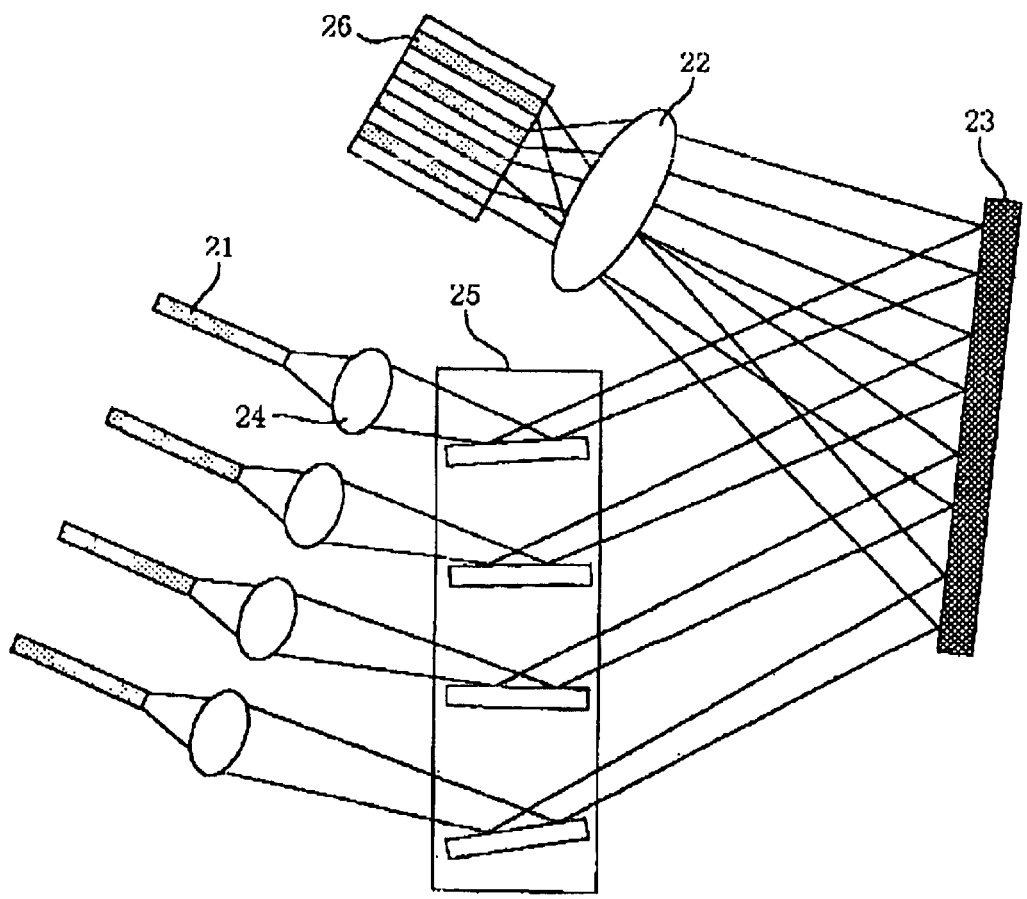
FIG 4 is a diagram showing a schematic structure of an MEMS type optical switch.

As shown in FIG. 4, the MEMS type optical switch comprises first and second optical fibers 21 and 26, collimation lenses 24, angle-degree-changeable mirror matrixes 25, and a reflection mirror 23. The beam of an optical signal input through a first optical fiber 21 is reduced by the collimation lens 24, and the light path of the optical beam is changed by the angle-degree-changeable mirror matrix 25. The optical beam whose light path is changed is reflected by the reflection mirror 23, reduced through a lens 22, and transmitted to a predetermined second optical fiber 26 from which the beam is output. By following this process, switching of optical fibers is performed.

In the embodiments to be described below, this MEMS type optical switch is used as a switching unit in the space division type optical switches 11 and 12, and the wavelength division type optical switch 13. In the case of the space division type optical switches 11 and 12, a wavelength-multiplexed optical signal is transmitted to the optical fibers. In a case where this MEMS type optical switch is used in the wavelength division type optical switch 13, an optical signal halving a single wavelength is transmitted to the optical fibers.

SECOND EXAMPLE OF USED SWITCH

An optical gate switch employing a semiconductor optical amplifier can be used as the switching unit 13a of the wavelength division type optical switch 13.

Figure 5:
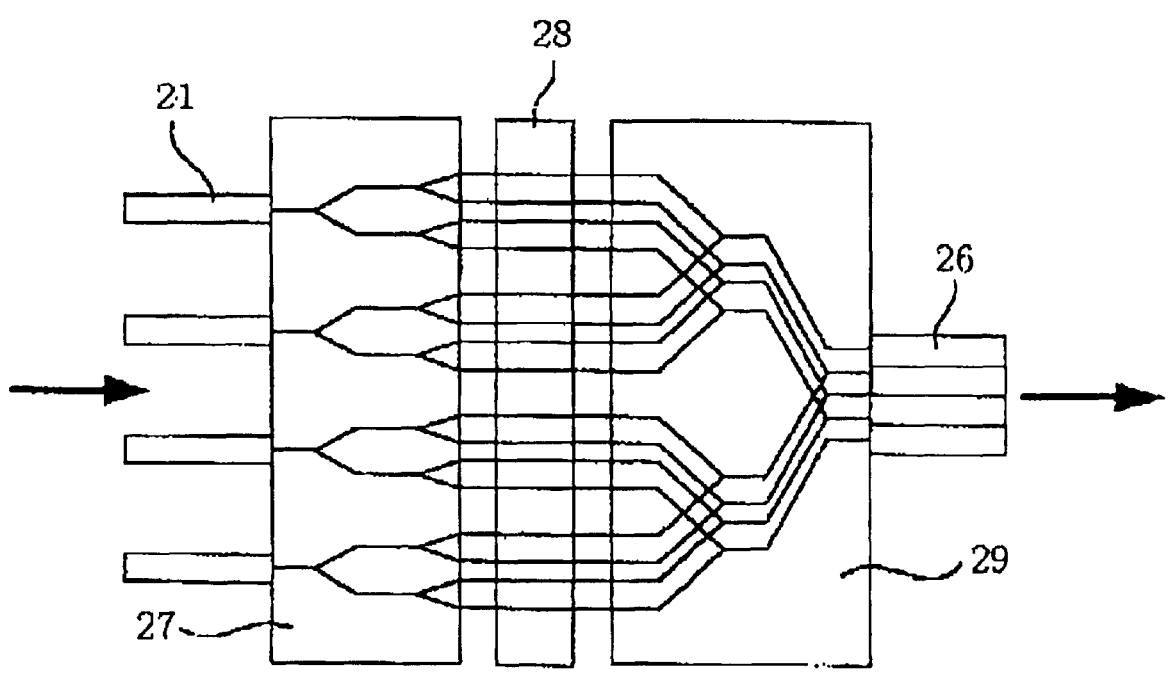
FIG. 5 is a block diagram showing a schematic structure of a gate switch using a semiconductor optical amplifier.

FIG. 5 is a block diagram showing a schematic structure of an optical gate switch employing a semiconductor optical amplifier, in FIG. 5, an example where the number of optical switch ports is 4×4 is shown. An optical signal input through a first optical fiber 21 is branched by an optical branching device 27.

Next, an optical gate switch matrix 28 employing a semiconductor optical amplifier selects and amplifies the optical beam. This optical gate switch matrix 28 is structured by arranging a plurality of semiconductor optical amplifiers (4×4 amplifiers in FIG. 5). An electric current is supplied only to an optical amplifier which exists in a selected light path thereby to allow the optical signal to pass through the this optical amplifier. Light paths in which the other optical amplifiers exist are controlled to be disconnected, After passing through the optical gate switch matrix 28, the optical signal is multiplexed by an optical multiplexing device 29, and transmitted to a second optical fiber 26 which is to output this optical signal.

In the embodiments to be described below, an optical gate switch matrix is used as the switching unit 13a of the wavelength division type optical switch 13. In this case, the first and second optical fibers 21 and 26 are to transit an optical signal having a single wavelength.

THIRD EXAMPLE OF USED SWITCH

In the third to fifth embodiments, a movable optical fiber type mechanical optical switch is used as the space division type optical switches 11 and 12.

Figure 6:
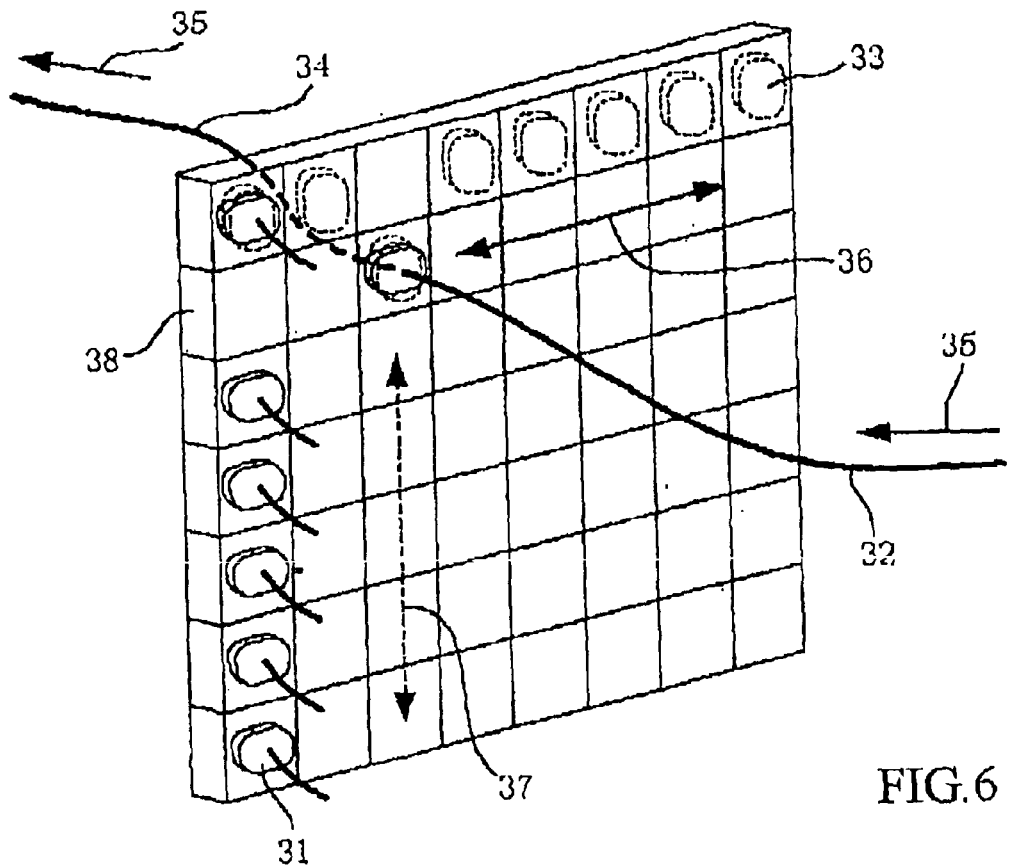
FIG. 6 is a perspective diagram sowing a schematic structure of a movable optical fiber type mechanical optical switch.

FIG. 6 is a perspective diagram showing a schematic structure of a movable optical fiber type mechanical optical switch.

FIG. 6 shows an example of a 7×8 matrix which includes seven first sliders 31 and eight second sliders 33. A first optical fiber 32 and the first sliders 31 exist on the front surface of a sheet, and a second optical fiber 34 and the second sliders 33 exist on the back surface of this sheet. Sliding portions of the first sliders 31 and second sliders 33 are made of Al2O3-TiC, etc.

A hole is opened in each of the first sliders 31. The first optical fiber 32 for transmitting an input signal light passes through this hole to be fixed to the hole. Likewise, the second optical fiber 34 for transmitting an output signal light is fixed to the second sliders 33. The first sliders 31 and die second sliders 33 are fit into grooves of a frame, 38 made of glass. The first sliders 31 can only move in the horizontal direction shown in FIG. 6 (represented by 36 in FIG. 6), while the second sliders 33 can only move in the vertical direction (represented by 37 in FIG. 6). With this structure, arbitrary optical fibers can be switched to each other on the matrix of N (a plural number, 7 in FIG. 6)×M (a plural number, 8 in FIG. 6). When optical fibers are connected to each other, a signal light is transmitted through the connected optical fibers in a direction indicated by an arrow 35, for example.

The sliders onto which the optical fibers are mounted are moved by a motor and a pulley connected to the motor, etc. which are not illustrated in FIG. 6.

Examples of demonstration where the optical switches shown in the first to third examples of used switch are incorporated into the optical switching systems explained in the first to third embodiments of the present invention, will be explained below.

The total insertion loss of the optical switching systems of the first to third embodiments and outer size of the switching devices are measured by varying the conditions such as types and numbers of ports of the first and second space division type optical switches, type and number of switch ports of the wavelength division type optical switch, number of add ports, number of drop ports, number of wavelengths to be multiplexed per optical fiber, etc. The measurement results are shown in FIG. 9.

The total insertion loss is the sum of optical signal losses caused between input and output of an optical signal through each path. FIG. 9 shows the maximum value of the total insertion loss among values or all the paths included.

FIRST EXAMPLE OF DEMONSTRATION

In this first example, the optical switching system according to the first embodiment shown in FIG. 1 is used, and the MEMS type optical switch shown in FIG. 4 is used as the first space division type optical switch 11, the second space division type optical switch 12, and the switching unit 13a of the wavelength division type optical switch.

The number of optical fibers to be input to the first space division type optical fiber (hereinafter, referred to as Input number), and the number of optical fibers to be output from the second space division type optical fiber (hereinafter, referred to as Output number) are both sixteen. The number of optical fibers to be output from the first space division type optical switch includes twelve fibers to be connected to the second space division type optical switch (r=12), and eight fibers to be connected to the wavelength division type optical switch (y=8). Accordingly, the number of ports included in the first space division type optical switch is 16×20.

The number of ports included in the second space division type optical switch 12 is set to 20×16.

The number of wavelengths to be multiplexed per optical fiber is set to forty for both input and output sides. The number of add ports and the number of drop ports are both set to sixty. Accordingly, the number of ports included in the wavelength division type optical switch is 380×380.

SECOND EXAMPLE OF DEMONSTRATION

In the second example, the optical switching system according to the first embodiment is used, and the MEMS type optical switch is used as the first space division type optical switch and the second space division type optical switch. A semiconductor optical amplifier is used as the switching unit of the wavelength division type optical switch.

Likewise the first example of demonstration, the Input number and the Output number are both set to sixteen. The number of optical fibers to be output from the first space division type optical switch includes twelve fibers to be connected to the second space division type optical switch (r=12), and eight fibers to be connected to the wavelength division type optical switch (y=8). Accordingly, the number of ports included in the first space division type optical switch is set to 16×20.

The number of ports included in the second space division type optical switch is set to 20×16.

The number of wavelengths to be multiplexed per optical fiber is set to forty for both input and output sides. The number of add ports and the number of drop ports are both set to sixty. Thus, the number of ports included in the wavelength division type optical switch is 380×380.

THIRD EXAMPLE OF DEMONSTRATION

In the third example, the optical switching system according to the first embodiment is used, and the movable optical fiber type mechanical optical switch is used as the first space division type optical switch and the second space division type optical switch. The MEMS type optical switch is used as the switching unit of the wavelength division type optical switch.

Likewise the first example of demonstration the Input number and the Output number are both set to sixteen. The number of optical fibers to be output from the first space division type optical switch includes twelve fibers to be connected to the second space division type optical switch (r=12), and the eight fibers to be connected to the wavelength division type optical switch (y=8). Accordingly, the number of ports included in the first space division type optical switch is 16×20.

The number of ports included in the second space division type optical switch is set to 20×16.

The number of wavelengths to be multiplexed per optical fiber is set to forty for both the input and output sides. The number of add ports and the number of drop ports are both set to sixty. Accordingly, the number of ports included in the wavelength division type optical switch is 380×380.

FOURTH EXAMPLE OF DEMONSTRATION

The fourth example employs the same embodiment and the same optical switches as those of the third example of demonstration. The only difference from the third example is the number or optical fibers. That is, the fourth example employs the optical switching system according to the first embodiment, employs the movable optical fiber type mechanical optical switch as the first space division type optical switch and the second space division type optical switch, and employs the MEMS type optical switch as the switching unit of the wavelength division type optical switch.

The Input number and the Output number are both set to twenty four. The number of optical fibers to be output from the first space division type optical switch includes twelve fibers to be connected to the second space division type optical switch (r=12), and twelve fibers to be connected to the wavelength division type optical switch (y=12). Accordingly, the number of ports included in the first space division the optical switch is 24×24.

The number of ports included in the second space division type optical switch is set to 24×24.

The number of wavelengths to be multiplexed per optical fiber is sot to eighty for both input and output sides. The number of add ports and the number of drop ports are both set to three hundreds. Thus, the number of ports included in the wavelength division type optical switch is 1260×1260.

FIFTH EXAMPLE OF DEMONSTRATION

The fifth example employs the optical switching system according to the first embodiment, employs the movable optical fiber type mechanical optical switch as the first space division type optical switch and the second space division type optical switch, and employs the MEMS type optical switch as the switching unit of the wavelength division type optical switch.

The Input number and the Output number are both set to thirty six. The number of optical fibers to be output from the first space division type optical switch includes twelve fibers to be connected to the second space division type optical switch (r=12), and twenty-four fibers to be connected to the wavelength division type optical switch (y=24). Accordingly, the number of ports included in the first space division type optical switch is 36×36.

The number of ports included in the second space division type optical switch is set to 36×36.

The number of wavelengths to be multiplexed per optical fiber is set to a hundred and sixty for both the input and output sides. The number of add ports and the number of drop ports are both set to six hundreds. Accordingly, the number of ports included in the wavelength division type optical switch is 4440×4440.

SIXTH EXAMPLE OF DEMONSTRATION

In this example, the optical switching system according to the second embodiment shown in FIG. 2 is used, and the MEMS type optical switch is used as the first and second space division type optical switches and the switching unit of the wavelength division type optical switch.

The Input number and the Output number are both set to sixteen. The number of optical fibers to be output froth the first space division type optical switch includes twelve fibers to be connected to the second space division type optical switch (r=12), and eight fibers to be connected to the wavelength division type optical switch (y=8). Accordingly, the number of ports included in the first space division type optical switch is 16×20.

The number of ports included in the second space division type optical switch is set to 20×16.

The number of wavelengths to be multiplexed per optical fiber is set to forty for both input and output sides. The number of add ports and the number of drop ports are both set to sixty. Accordingly, the number of ports included in the wavelength division type optical switch is 380×380.

SEVENTH EXAMPLE OF DEMONSTRATION

In this example, the optical switching system according to the third embodiment shown in FIG. 3 is used, and the MEMS type optical switch is used as the first and second space division type optical switches and the switching unit of the wavelength division type optical switch.

The Input number and the Output number are both set to sixteen. The number of optical fibers to be output from the first space division type optical switch includes twelve fibers to be connected to the second space division type optical switch (r=12), and eight fibers to be connected to the wavelength division type optical switch (y=8). Accordingly, the number of ports included in the first space division type optical switch is 6×20.

The number of ports included in the second space division type optical switch is set to 20×16.

The number of wavelengths to be multiplexed per optical fiber is set to forty for both input and output sides. The number of add ports and the number of drop ports are both set to sixty. Accordingly, the number of ports included in the wavelength division type optical switch is 380×380.

Data are gathered based on comparisons. This is to compare the examples of demonstration according to the present invention with examples of demonstration according to a conventional method and to check total insertion loss of light, and size of the devices.

FIRST EXAMPLE OF COMPARISON

Figure 7:
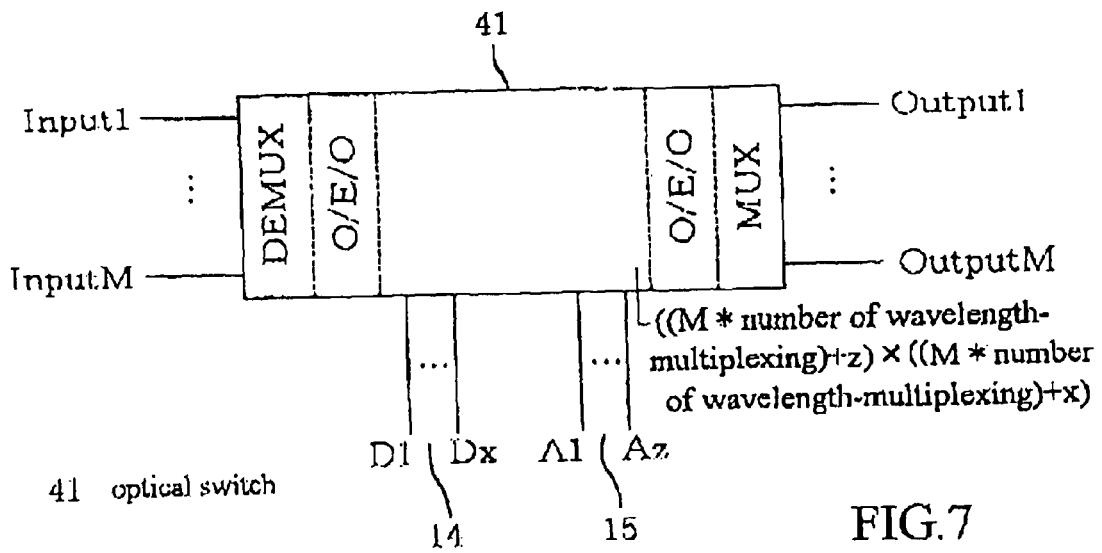
FIG. 7 is a block diagram showing a schematic structure of a conventional optical switching system.

In order to compare the examples of demonstration according to the present invention, a switching method using a wavelength division type optical switch shown in FIG. 7 is used as an example of comparison. The MEMS type optical switch is used as the switching unit of an optical switch 41. As illustrated in FIG. 7, the O/E/O conversion method is employed in this example of comparison.

In this example, the Input number and the Output number are both set to sixteen The number of add ports and the number of drop ports are both sixty. The number of wavelengths to be multiplexed per optical fiber is set to forty for both input and output sides. Accordingly, the number of ports included in the optical switch 41 is 700×700.

With regard to the optical switching system according to this first example, the total insertion loss and the outer size of the device are measured.

SECOND EXAMPLE OF COMPARISON

Figure 8:
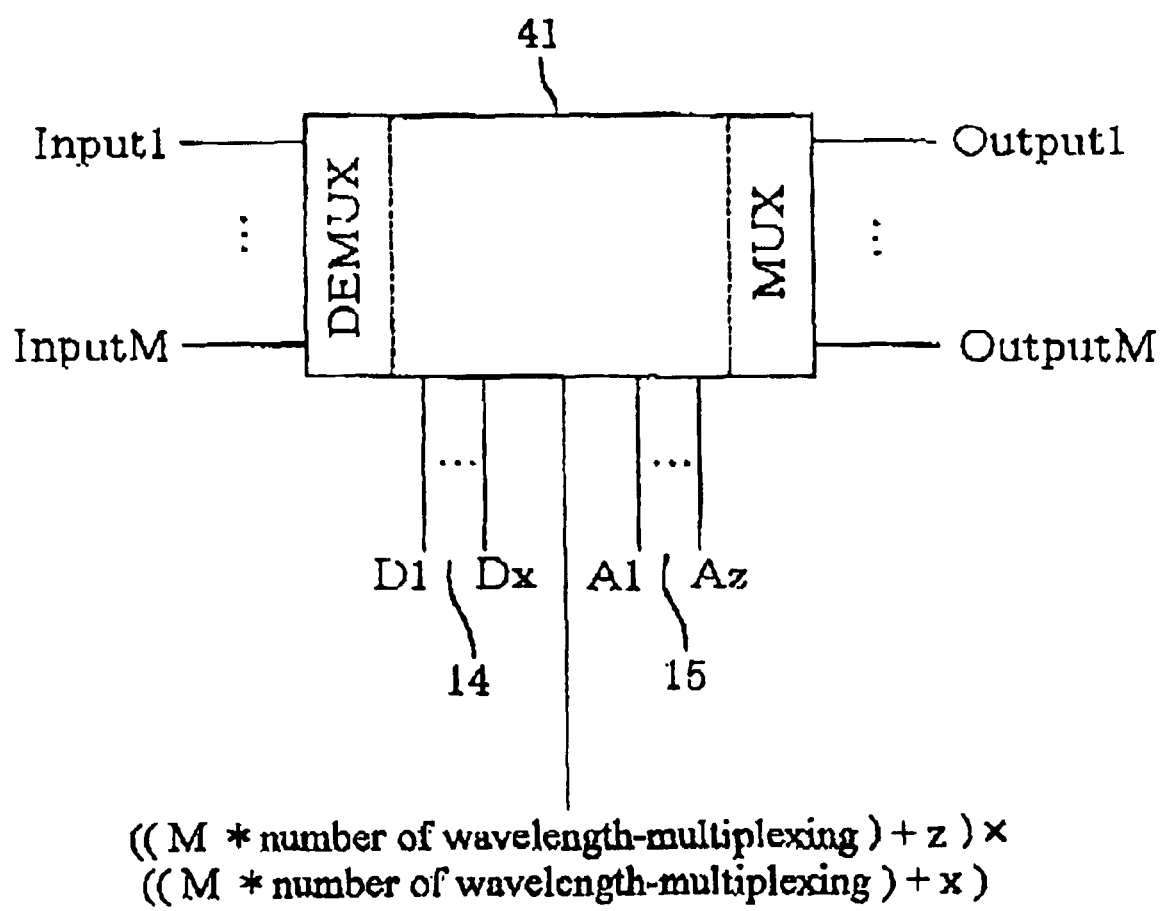
FIG 8 is a block diagram, showing a schematic structure of a conventional optical switching system.
Figure 10:
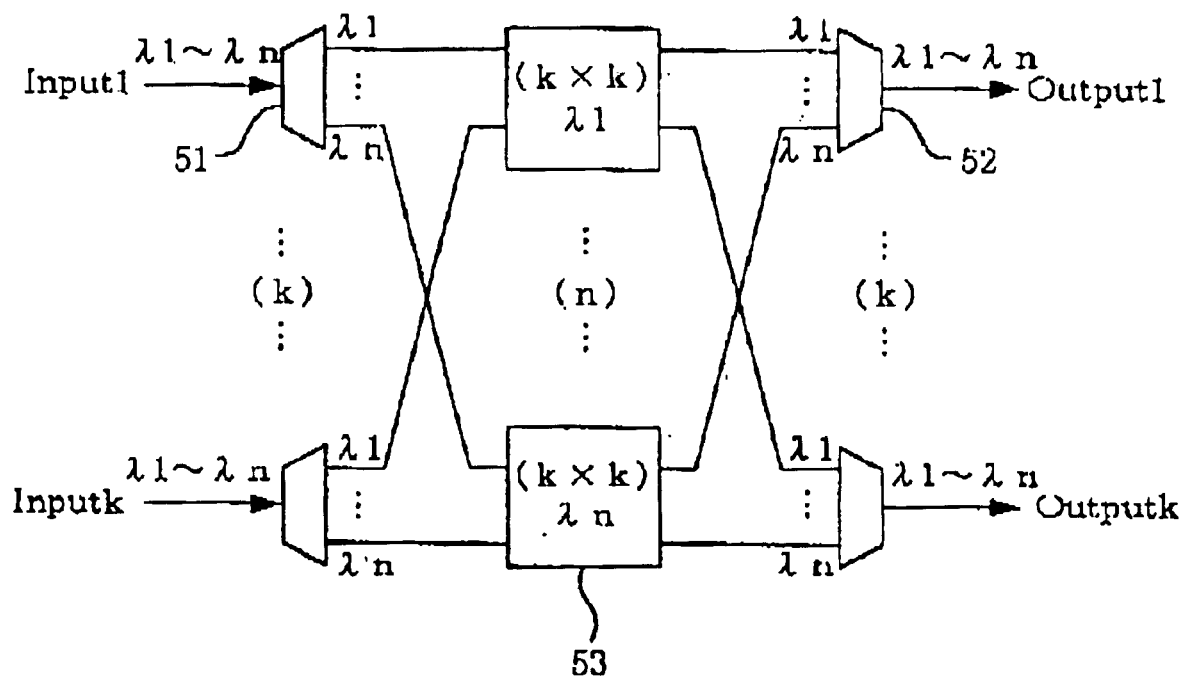
FIG. 10 is a block diagram showing a schematic structure of a conventional optical switching system.
Figure 11:
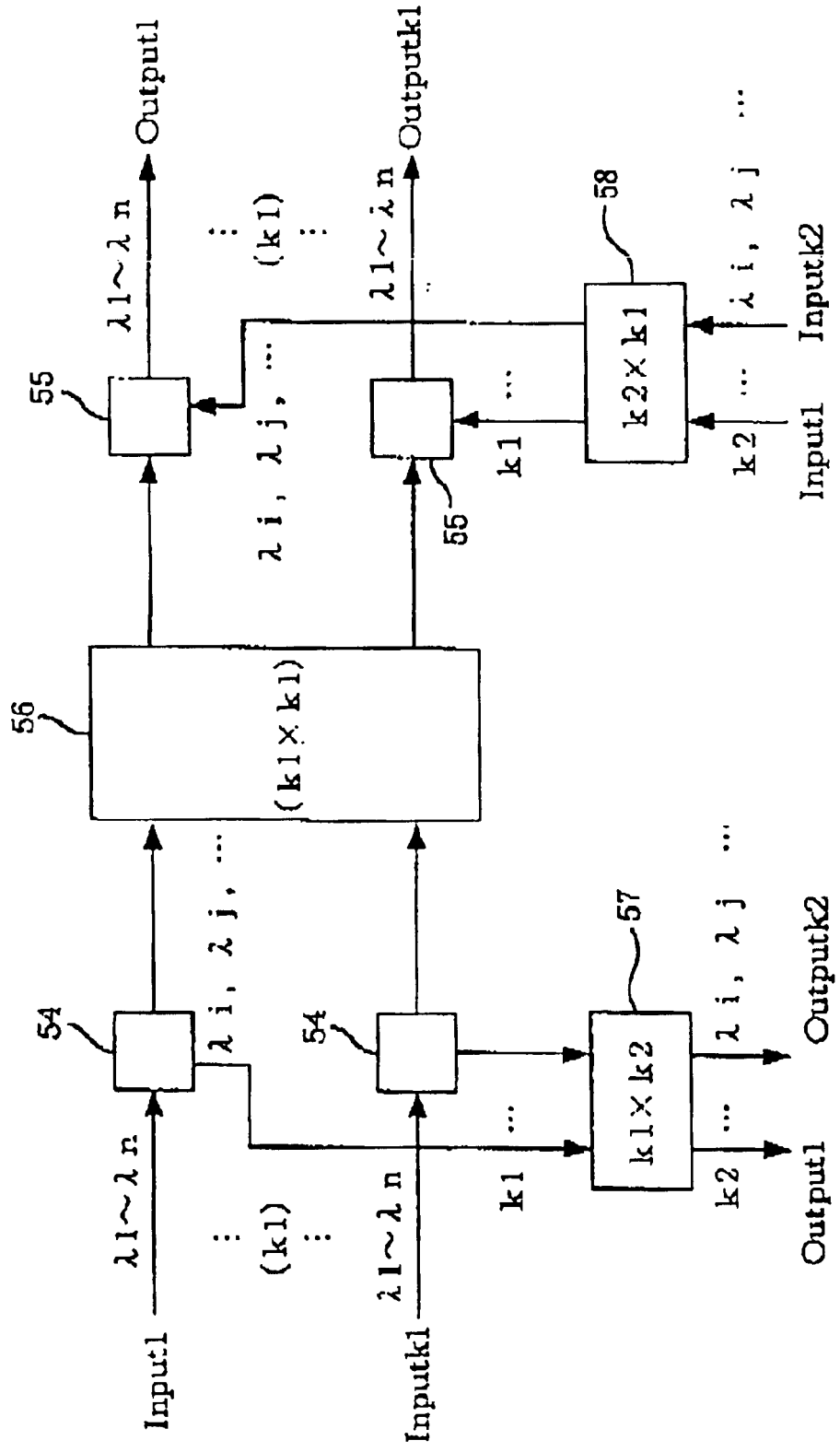
FIG. 11 is a block diagram showing a schematic structure of a conventional optical switching system
Figure 12:
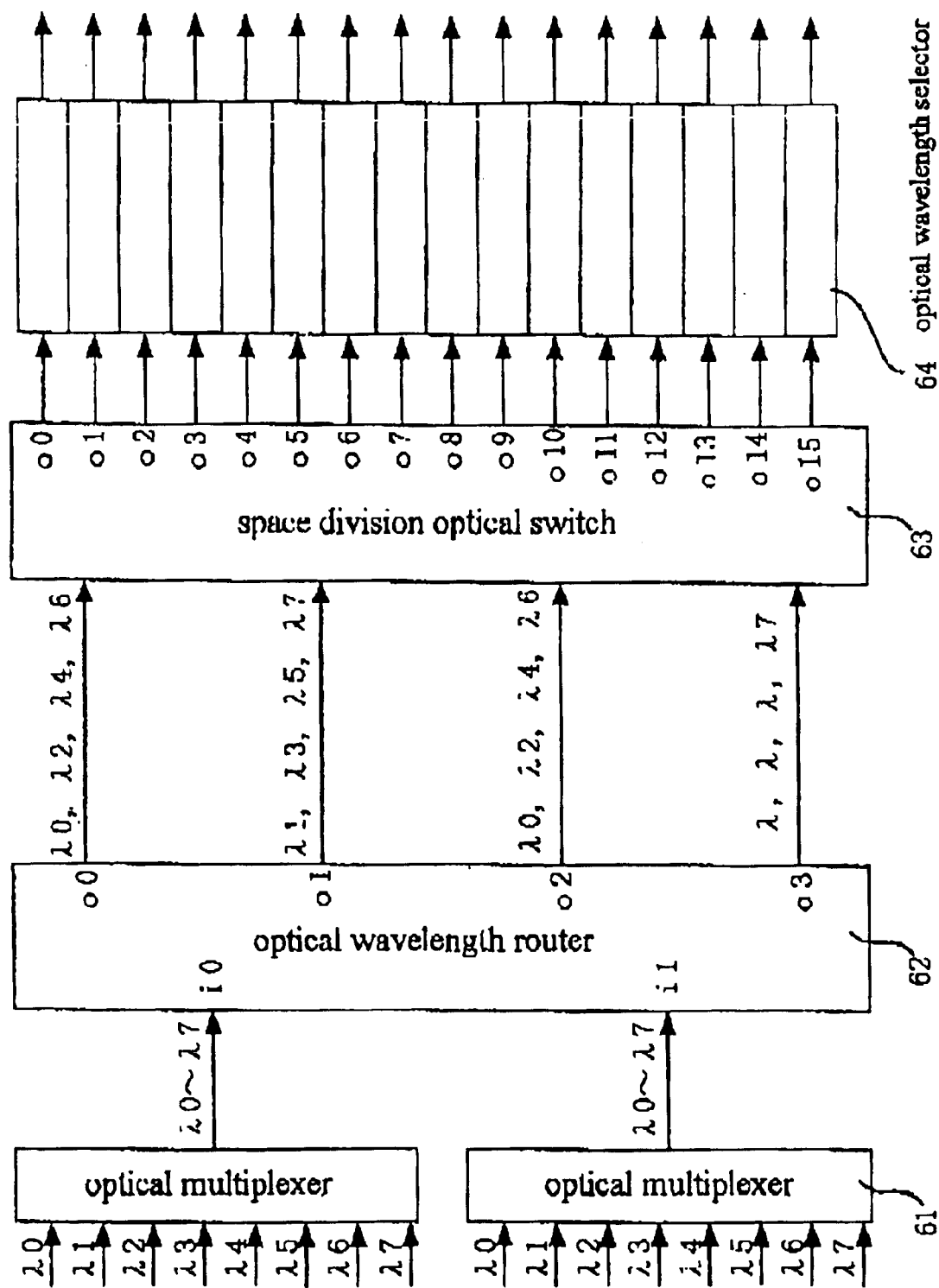
FIG. 12 is a block diagram showing a schematic structure of a conventional optical switching system.

As a second example of comparison, a switching method using a wavelength division type optical switch shown in FIG. 8 is use Likewise the first example of comparison, the MEMS type optical switch is used as the switching unit of an optical switch 41. As shown in FIG. 8, the O/E/O conversion method is not employed in this second example of comparison, unlike the first example of comparison.

The Input number and the Output number are both set to sixteen. The number of add ports and the number of drop ports are both set to sixty. The number of wavelengths to be multiplexed per optical fiber is set to forty for both input and output sides. Accordingly, the number of ports included in the optical switch 41 is 700×700. With regard to the optical switching system according to this second example of comparison, the total insertion loss and the outer size of the device are measured.

CONCLUSIONS FROM EXAMPLES OF DEMONSTRATION AND EXAMPLES OF COMPARISON

With reference to the results of testing the first to seventh examples of demonstration and the fist and second examples of comparison, the following conclusions (1) to (6) can be obtained.

(1) When comparing the test results of the first example of demonstration and tie first example of comparison, it can be said that with the structure of the optical switching system according to the present invention, the size of the, device can be greatly reduced while the total insertion loss of the optical switching system is kept lower. This is because the optical switching system according to the present invention requires an O/E/O conversion device only for the wavelength division type optical switch, while the conventional optical switching system according to the first example of comparison requires O/E/O conversion devices for all pores included in the optical switch.

(2) When comparing the test results of the fist example of demonstration and the second example of comparison, it can be said that the first example of demonstration achieves more preferable values in both the insertion loss of light and size of the device, than the second example of comparison. Since the second example of comparison does not include an O/E/O device, the total insertion loss of light of the optical switching system becomes high. Further, since the optical switching system according to the present invention does not perform O/E/O conversion in the space division type optical switches of the first example of demonstration, it is possible to miniaturize the device. Moreover, since the space division type optical switches according to the present invention simply need to perform switching on an optical fiber by optical fiber basis, it is possible to employ a switch including a relatively small number of ports.

On the other hand, the second example of comparison results in a high insertion loss of light. According to the optical switching system of the present invention, with the use of the least necessary number of O/E/O conversion device, it is possible to greatly reduce the insertion loss of light and also to miniaturize the device. That is, it is possible to realize an optical switching system that satisfies miniaturization of the device and reduction in insertion loss of optical signals at a same time.

(3) From the test results of the fist example of demonstration and the second example of demonstration, it can be said that when using a gate switch employing a semiconductor optical amplifier as the wavelength division type optical switch, an optical switching system that can satisfy miniaturization of the device and reduction in insertion loss of optical signals at a same time can be realized.

(4) From the test results of the first example of demonstration and the third example of demonstration, it can be said that by using the movable optical fiber type mechanical optical switch as the first and second space division type optical switches, the total insertion loss of light of the optical switching system can be greatly reduced.

(5) The third to fifth examples of demonstration are for comparing insertion loss of light and size of the device by using the same structure of the optical switching system and the same types of the optical switches, while varying the values such as the number of optical fibers, the number of add ports, the number or drop ports, etc. The results shown in FIG. 9 indicates that even when the numbers of ports included in the space division type optical switches and the wavelength division type optical switch are greatly increased, the total insertion loss of light and the size of the device do not increase so much.

(6) Comparison among the first, sixth, and seventh examples of demonstration is carried out by using the same types of the optical switches and the same numbers of switch ports, and varying the embodiments from the first to third embodiments. When referring to the test results of the first example of demonstration and the sixth example of demonstration, it can be said that an optical switching system that satisfies miniaturization of the device and reduction in insertion loss of optical signals at a same time can be realized according to the second embodiment. That is, regardless of how die control signal regarding switching is transmitted in the first embodiment and the second example of demonstration, it is possible to satisfy the reduction in total insertion loss and miniaturization of the device at a same time. In the seventh example of demonstration, even through the size of the device becomes large because the device includes an O/E/O conversion device in addition to the signal control device, the total insertion loss is sufficiently reduced.

Based on the above conclusions (1) to (6), it is possible to provide an optical switching system which realizes a device in a smaller size, a larger number of switch ports, and lower insertion loss at a same time, when compared to the conventional optical switching systems.

As obvious from the above explanation, the optical switching systems according to the embodiments and examples of demonstration control signals that can pass the device while being wavelength-multiplexed on an optical fiber by optical fiber basis to pass only the space division type optical switches, and control optical signals that should be processed on a wavelength by wavelength basis, or require add or drop to pass the wavelength division type optical switch which applies wavelength division and wavelength multiplexing. Accordingly, it is possible to satisfy miniaturization of the device and reduction in insertion loss of light at a same time. Further, according to the present invention, even when the number of switch points increases, increase in insertion loss of optical signals and increase in size of the device can be avoided.

What is claimed is:

1. An optical switching system comprising:
   a first space division type optical switch which is positioned at an input side, and performs switching on an optical fiber by optical fiber basis;
   a second space division type optical switch which is positioned at an output side, and performs switching on an optical fiber by optical fiber basis; and
   a wavelength division type optical switch which receives a wavelength-multiplexed signal through an optical fiber, performs wavelength division, switching on a wavelength by wavelength basis, and wavelength multiplexing, and outputs a wavelength-multiplexed signal through an optical fiber,
   wherein some of optical fibers which are output from said first space division type optical switch are directly led to said second space division type optical switch, and the rest of optical fibers which are output from said first space division type optical switch are led to said wavelength division type optical switch, and optical fibers which are output from said wavelength division type optical switch are led to said second space division type optical switch.

2. The optical switching system according to claim 1, wherein said wavelength division type optical switch includes an add port and/or a drop port for inputting or outputting an optical signal having a single wavelength.

3. The optical switching system according to claim 1, wherein said wavelength division type optical switch includes O/E/O (optical/electric/optical) conversion devices on both an input side and an output side thereof, respectively.

4. The optical switching system according to claim 3, wherein said O/E/O conversion devices extract a control signal for controlling said first and second space division type optical switches from an electric signal.

5. The optical switching system according to claim 1, wherein a routing signal for said first and second space division type optical switches is acquired from said wavelength division type optical switch, and transmitted to said first and second space division type optical switches, thereby routing is performed in said first and second space division type optical switches.

6. The optical switching system according to claim 1, further comprising a signal control device,
   wherein a control signal output from said signal control device is transmitted to said first and second space division type optical switches and said wavelength division type optical switch, and routing is performed in each switch based on the control signal.

7. The optical switching system according to claim 1, wherein at least one of said first and second space division type optical switches is constituted by a movable optical fiber type mechanical optical switch or a mirror type switch.

8. The optical switching system according to claim 1, wherein a switching unit of said wavelength division type optical switch is constituted by a mirror type switch or an electric optical switch.

9. The optical switching system according to claim 7, wherein said mirror type switch is constituted by an MEMS (Micro-electromechanical System) using silicon.

10. The optical switching system according to claim 8, wherein said mirror type switch is constituted by an MEMS (Micro-electromechanical System) using silicon.

11. The optical switching system according to claim 8, wherein said electric optical switch is constituted by an optical gate switch matrix using a semiconductor optical amplifier.

12. An optical switching method comprising:
   a first space division type optical switching stop of performing switching on an optical fiber by optical fiber basis on a side of input optical fibers;
   a second space division type optical switching step of performing switching on an optical fiber by optical fiber basis on a side of output optical fibers; and
   a wavelength division type optical switching step of receiving a wavelength-multiplexed signal from an optical fiber, performing wavelength division, switching on a wavelength by wavelength basis, and wavelength multiplexing, and outputting a wavelength-multiplexed signal through an optical fiber;
   wherein some of outputs obtained in said first space division type optical switching step are led to said second space division type optical switching step, the rest of outputs obtained in said first space division type optical switching step are led to said wavelength division type optical switch; and
   outputs obtained in said wavelength division type optical switching step are led to said second space division type optical switching step.

13. The optical switching method according to claim 12, wherein said wavelength division type optical switching step performs O/E/O (optical/electric/optical) converting steps on both an input side and an output side, respectively.

14. The optical switching method according to claim 13, wherein said wavelength division type optical switching step controls said first space division type optical switching step and said second space division type optical switching step based on an electric signal generated in said O/E/O converting steps.

15. The optical switching method according to claim 12, wherein a routing signal for said first and second space division type optical switching steps is acquired from said wavelength division type optical switching step, and transmitted to said first and second space division type optical switching steps, thereby routing is performed in said first and second space division type optical switching steps.

16. The optical switching method according to claim 12, further comprising a step of generating a control signal and supplying the control signal to said first and second space division type optical switching steps and said wavelength division type optical switching step, wherein said first and second space division type optical switching steps and said wavelength division type optical switching step perform routing in each switch based on the supplied control signal.

* * * * *